United States Patent [19]

Haneda et al.

[11] Patent Number: 5,721,772
[45] Date of Patent: Feb. 24, 1998

[54] SUBBAND ACOUSTIC ECHO CANCELLER

[75] Inventors: Yoichi Haneda, Tokyo; Shoji Makino, Machida; Akira Nakagawa, Kokubunji; Suehiro Shimauchi; Junji Kojima, both of Tokyo, all of Japan

[73] Assignee: Nippon Telegraph and Telephone Co., Tokyo, Japan

[21] Appl. No.: 730,247

[22] Filed: Oct. 15, 1996

[30] Foreign Application Priority Data

Oct. 18, 1995 [JP] Japan .................. 7-269646

[51] Int. Cl.⁶ .................. H04M 9/00; G06F 17/60
[52] U.S. Cl. .................. 379/406; 379/345; 379/410; 379/411; 364/724.1; 364/724.19
[58] Field of Search .................. 379/406, 402, 379/408, 410, 411, 345; 364/724.19, 724.1, 724.12

[56] References Cited

U.S. PATENT DOCUMENTS

| | | | |
|---|---|---|---|
| 4,757,527 | 7/1988 | Beniston et al. | 379/410 |
| 5,272,695 | 12/1993 | Makino et al. | 379/410 |
| 5,329,587 | 7/1994 | Morgan et al. | 379/411 |
| 5,535,149 | 7/1996 | Mori et al. | 379/411 |
| 5,548,642 | 8/1996 | Diethorn | 379/411 |
| 5,566,167 | 10/1996 | Duttweiler | 379/411 |
| 5,644,596 | 7/1997 | Sih | 379/411 |

*Primary Examiner*—Krista Zele
*Assistant Examiner*—Jacques M. Saint-Surin
*Attorney, Agent, or Firm*—Pollock, Vande Sande & Priddy

[57] ABSTRACT

In a subband acoustic echo canceller, FG/BG filters are provided in M ones of N subbands into which the received signal is divided, and adaptive filters are provided in the other remaining subbands. In the respective FG/BG filters, during the detection of a non-double-talk state their transfer logic parts output state signals GD-j, GD-k, ... and their adaptive operation control parts each apply an adaptation condition signal ADP to the adaptive filter in each of the above-mentioned other remaining subbands when a predetermined number or more of the FG/BG filters output the state signals GD-j, GD-k, ... The adaptive filter updates the subband estimated echo path coefficient only when it is supplied with the signal ADP.

6 Claims, 10 Drawing Sheets

SUBBAND ACOUSTIC ECHO CANCELLER

BACKGROUND OF THE INVENTION

The present invention relates to an echo canceller and, more particularly, to a subband acoustic echo canceller for cancelling or suppressing echoes in each subband which would otherwise cause howling and create an psychoacoustic problem in a 2-wire/4-wire converting transmission line, a hands-free communication system and other transmitting and receiving apparatus.

It is considered that teleconference systems such as a video conference system, a voice conference system, a multimedia desktop conference system will come into wider use. These teleconference systems usually employ what is called a hands-free communication system comprising a loudspeaker and a microphone, instead of using conventional handsets. In the hands-free communication system, since sounds coming out from the loudspeaker are received as echoes by the microphone unlike in the case of using the handsets, a far-end speaker hears voices of his own from the loudspeaker with some transmission delay—this causes a hindrance to his communications with others. At the worst, echoes will give rise to howling.

A possible technique that has been proposed as a solution to this problem is an acoustic echo canceller. The basic function of the acoustic echo canceller is to generate an echo replica by applying a loudspeaker output signal to an electrically implemented estimated echo path and subtract the echo replica from the echo received by the microphone. The acoustic echo canceller equipped with such a function is indispensable to the hands-free communication. Additionally, since echoes occur due to an impedance mismatch in a telephone 2-wire/4-wire conversion as well as in the above-mentioned acoustic systems, the acoustic echo canceller is also essential to a line and a telephone exchange.

To facilitate a better understanding of the present invention, a description will be given first, with reference to FIG. 1, of a prior art example of the hands-free communication system containing transmission lines. Send speech uttered by a talker 10 is converted by a microphone 1 into an electric signal, which is fed to a loudspeaker 4 via a send signal amplifier 5, a telephone exchange 12, a transmission line 9, another telephone exchange 12 and a received signal amplifier 8. The electric signal is converted by the loudspeaker 4 into speech for transmission to a listener 11. The hands-free communication system does not require both of the talker and the listener to hold handsets in their hands, and hence it provides advantages that they can talk with each other while working with their hands and that a realistic face-to-face communication can be achieved. This system is now being widely used in a teleconference system, a video conference system, voice conference system and a hands-free telephone.

On the other hand, the presence of echoes has been pointed out as a defect of the hands-free communication system. In FIG. 1, the speech sent via the loudspeaker 4 to the receiving side is picked up by a microphone 3 and the microphone output is sent via a send signal amplifier 7, the telephone exchange 12, the transmission line 9, the telephone exchange 12 and a received signal amplifier 6 to a loudspeaker 2 at the sending side, from which it is reproduced. This is a phenomenon of echo that the speech uttered by the speaker 10 is reproduced from the loudspeaker 2 at his side; this phenomenon is called an acoustic echo. The acoustic echo exerts adverse effects on the hands-free communication system, such as a hindrance to communications and subscriber discomfort. The speech reproduced from the loudspeaker 2 is further received by the microphone 1, forming a closed loop of signals. When the gain of this closed loop is greater than 1, howling occurs and communication becomes impossible. The echo canceller is used to solve such a problem of the hands-free communication system.

FIG. 2 illustrates in block form a prior art example of the echo canceller. Reference numeral 21 indicates generally the echo canceller. Reference numeral 22 denotes an estimated echo path, 23 an echo path estimating part and 24 a subtractor. In the following description, signals will all be assumed to be discrete and the discrete time will be expressed by n. Reference character x(n) denotes a received signal, h(n) the transfer characteristic (which is expressed as an impulse response and is a vector) of the echo path between the receiving loudspeaker 4 and the sending microphone 3, y(n) an echo, ŷ(n) an echo replica, ĥ(n) an estimated value of the echo path impulse response, e(n) an error signal, s(n) a send signal of the near-end speaker and z(n) the microphone output signal.

The echo canceller 21 estimates first the impulse response h(n) of the echo path 26 in the echo path estimating part 23 and transfers the estimated value ĥ(n) to the estimated echo path 22. In the estimated echo path 22 the estimated value ĥ(n) and the received signal x(n) are convoluted into the echo replica ŷ(n). The echo replica is subtracted by the subtractor 24 from the output signal z(n) of the microphone 3. When the echo path impulse response h(n) is estimated accurately, the echo y(n) and the echo replica ŷ(n) are nearly equal to each other and the error signal e(n) resulting from the subtraction is nearly equal to near-end speech S(n), eventually leading to the cancellation of the echo y(n) in the microphone output.

Since the transfer characteristic h(n) of the actual echo path 26 varies as a person or object moves, the estimated echo path needs to be able to follow the temporal variation in the echo path transfer characteristic h(n). On this account, the echo path estimating part 23 estimates the impulse response of the echo path 26 through the use of an adaptive algorithm. The adaptive algorithm herein mentioned is one that determines, by using the received signal x(n) and the error signal e(n), the estimated value ĥ(n) of the impulse response which minimizes the power of the error signal e(n). As such adaptive algorithms, there are known an LMS (least mean squares) algorithm, an NLMS (normalized LMS) algorithm, ES (exponentially weighted step-size) algorithm and so forth. In this specification, the state in which the estimated transfer characteristic value ĥ(n) of the estimated echo path 22 approaches the transfer characteristic value h(n) of the true echo path 26 and the echo replica ŷ(n) becomes substantially equal to the echo y(n) will hereinafter be referred to as the state of convergence of the adaptive algorithm. Incidentally, a combination of the echo path estimating part 23 and the estimated echo path 22 will be called an adaptive filter.

In the presence of the send signal s(n) of the near-end speaker, however, the algorithm for estimating the echo path transfer characteristic regards it as an error and estimates the transfer characteristic of the estimated echo path 22 in a wrong direction accordingly. To avoid this, it is necessary to stop the estimation when detecting a double-talk state in which the received signal x(n) and the send signal s(n) of the near-end speaker are mixed.

As a solution to the problem of stopping the adaptive estimation during the double-talk, a foreground/background (FG/BG) filter, which enables an accurate estimation of the echo path, is disclosed in, for example, U.S. Pat. Nos. 3,787,645 and 4,757,527, or Y. Haneda et al, "Implementation and Evaluation of an Acoustic Echo Canceller using the Duo-filter Control system," AEC workshop, 95.6.

FIG. 3 is a block diagram for explaining an echo canceller described in Japanese Patent Application Laid-Open No. 226700/95 which employs the FG/BG filter. In FIG. 3 the parts corresponding to those in FIG. 2 are identified by the same reference numerals. Reference numeral 50 indicates generally the echo canceller using the FG/BG filter. Reference numeral 51 denotes an FG side estimated echo path and reference character $\hat{h}_f(n)$ represents an FG side estimated echo path coefficient. Reference character $\hat{y}_f(n)$ represents an FG side echo replica and 52 denotes an echo path estimating part. Reference numeral 53 denotes a BG side estimated echo path and $\hat{h}_b(n)$ represents a BG side estimated echo path coefficient. Reference character $\hat{y}_b(n)$ represents a BG side echo replica. Reference numeral 54 denotes a transfer logic circuit, which comprises an input decision part 62, an error power comparison part 63 and a power comparison part 64. Reference numerals 55 and 56 denote subtractors. Reference character $e_b(n)$ represents a BG side error and $e_f(n)$ an FG side error, which becomes a send signal.

The power mentioned herein is a time integral value of a signal, which is calculated by the following equation in the case of a discrete signal.

$$P_x(n) = \sum_{i=1}^{k-1} x^2(n-i)$$

where k represents the integration time.

In the echo canceller 50 using the FG/BG filter, the impulse response of the echo path is estimated first in the echo path estimating part 52 and the estimated value $\hat{h}_b(n)$ is transferred to the BG side estimated echo path 53, wherein the estimated value $\hat{h}_b(n)$ and the received signal x(n) are convoluted to create the echo replica $\hat{y}_b(n)$. In the subtractor 55 the echo replica $\hat{y}_b(n)$ is subtracted from the output signal z(n) of the microphone 3. When the impulse response of the echo path is estimated accurately, the echo y(n) and the echo replica $\hat{y}_b(n)$ are nearly equal to each other. Next, if the BG side estimated echo path 53 is approximate to the true echo path, the coefficient of the BG side estimated echo path 53 is transferred to the FG side estimated echo path. In general, the approximation of the BG side estimated echo path 53 to the true echo path is recognized by comparing the difference $e_b(n)$ between the microphone output signal z(n) and the echo replica $\hat{y}_b(n)$ with the power of the microphone output signal z(n) as described below. That is, when:

(a) it is decided in the input decision part 64 that the power of received signal x(n) is greater than a preset threshold value;

(b) it is determined in the power comparison part 64 that the power of the error $e_b(n)$ is smaller than the power of the microphone output signal z(n) in excess of a certain value; and (c) it is determined in the error power comparison part 63 that the power of the BG side error $e_b(n)$ is smaller than the power of the FG side error $e_f(n)$, It is considered that the estimated coefficient $\hat{h}_b(n)$ simulates the actual echo path more accurately than the FG side estimated echo path coefficient $\hat{h}_f(n)$, and consequently, the BG side estimated echo path coefficient $\hat{h}_b(n)$ is transferred to the FG side estimated echo path 51. The coefficient $\hat{h}_f(n)$ is updated only when the three conditions mentioned above are satisfied. When the echo path estimating part 52 makes a misestimation during double-talk, the above-listed conditions are not met and the BG side estimated echo path coefficient is not sent to the FG side; hence, the FG side estimated echo path 51 maintains an accurate echo cancellation. The above-mentioned power comparison of the condition (b) may also be substituted with a comparison of short time peak hold values set forth in Japanese Patent Application Laid-Open No. 22670012/95, for instance.

As described above, the echo canceller using the FG/BG filter permits an accurate echo cancellation during double talk, but it requires the provision of an estimated echo path in either of the FG and BG sides, which leads to the defect of increased computational complexity.

As an echo cancelling method for significant reduction of the computational complexity, a subband acoustic cancelling method is disclosed in, for example, S. Gay et al., "Fast Converting Subband Acoustic Echo Cancelling using RAP on the WEDSP 16," IEEE 1990 International Conference on Acoustics, Speech and Signal Processing, pp. 1141–1144 and U.S. Pat. No. 5,272,695. In the subband acoustic echo cancellation, the received signal and the echo are each divided into N subbands, an estimated echo path is formed by an adaptive filter in each subband as in the case of the full band and the estimated echo path is estimated by an adaptive algorithm so that the residual echo (an error) in each subband is minimized. With this method, since the bandwidth of each subband is set to 1/N of the full bandwidth, the signal sampling rate can be reduced down to 1/N. Accordingly, the decimation of samples of the subband received signal and the subband echo at a 1/N decimation rate would allow reduction of the filter length of the adaptive filter in each subband down to 1/N. This enables appreciable reduction of the computational complexity of the adaptive algorithm. In addition, the convergence speed of the estimated echo path can be increased because the signal is flattened (or whitened) in each subband.

However, the subband acoustic echo cancellation scheme also suffers the defect of making a serious error in the estimation of the estimated echo path during double talk.

SUMMARY OF THE INVENTION

It is therefore an object of the present invention to provide a subband acoustic echo canceller which makes no serious estimation error during double talk and permits reduction of the computational complexity of the adaptive algorithm used.

The subband acoustic echo canceller according to the present invention comprises:

a received signal subband analysis part for dividing a received signal sent out onto an echo path into signals of N subbands and for decimating samples of each of said divided signals to generate a subband received signal, said N being an integer equal to or greater than 2;

an echo subband analysis part for dividing an echo resulting from the propagation of said received signal over said echo path into signals of N subbands and for decimating samples of each of said divided signals to generate a subband echo signal;

N subband echo cancelling parts each provided in correspondence with one of said N subbands, for cancelling said subband echo signal;

wherein said N subband echo cancelling parts each comprises:

first estimated echo path means of estimated first estimated echo path coefficients, for generating a first subband echo replica by convoluting said first estimated echo path coefficients and said subband received signal;

first subtracting means for subtracting said first subband echo replica from said subband echo signal to generate a first error signal; and an estimating part for estimating said first estimated echo path coefficients from said first error signal and said subband received signal by an adaptive algorithm and for setting said first estimated echo path coefficients in said first estimated echo path means; and wherein M predetermined ones of said subband echo cancelling parts each comprises:

second estimated echo path means of second estimated echo path coefficients, for generating a second subband echo replica by convoluting said second estimated echo path coefficients and said subband received signal, said M being an integer equal to or greater than 1 but smaller than N−1;

second subtracting means for subtracting said second subband echo replica from said subband echo signal to generate a second error signal, said second error signals of said M predetermined subband echo cancelling parts and said first error signals of those other than said M subband echo cancelling parts being outputted as subband error signals; and transfer logic control means which detects the signal states of said subband received signal, said subband echo signal and said first and second error signals and which, if said signal states satisfy predetermined conditions, decides that said first estimated echo path is in the state of convergence and sets said first estimated echo path coefficients as said second estimated echo path coefficients in said second estimated echo path means to update its coefficients, and, if said signal states does not satisfy said predetermined conditions, inhibits the updating of said second estimated echo path coefficients; and a send signal subband synthesis part for synthesizing said subband error signals from said N subband echo cancelling parts through interpolation and for outputting said synthesized signal as a full-band send signal.

According to the present invention, the signal to be processed is divided into signals of a plurality of subbands and the FG/BG filter using two estimated echo paths is adopted in those of the subbands in which the power of the speech signal is large, but only one estimated echo path is used in the other subbands, and double-talk control depends on the decision by the FG/BG filter. The subband acoustic echo canceller of such a configuration permits reduction of the computational complexity as compared with the conventional echo canceller using the FG/BG filter in every subband.

DESCRIPTION OF THE PREFERRED EMBODIMENT

The present invention applies the FG/BG scheme to the subband acoustic echo canceller. According to the present invention, FG/Bg filters are used in some of the subbands involved and only one adaptive filter is used in each of the remaining subbands. The subbands in which the FG/BG filters are used can be determined, for example, on the basis of the general frequency-amplitude characteristic of the full-band input speech signal as described below.

Figure 4:
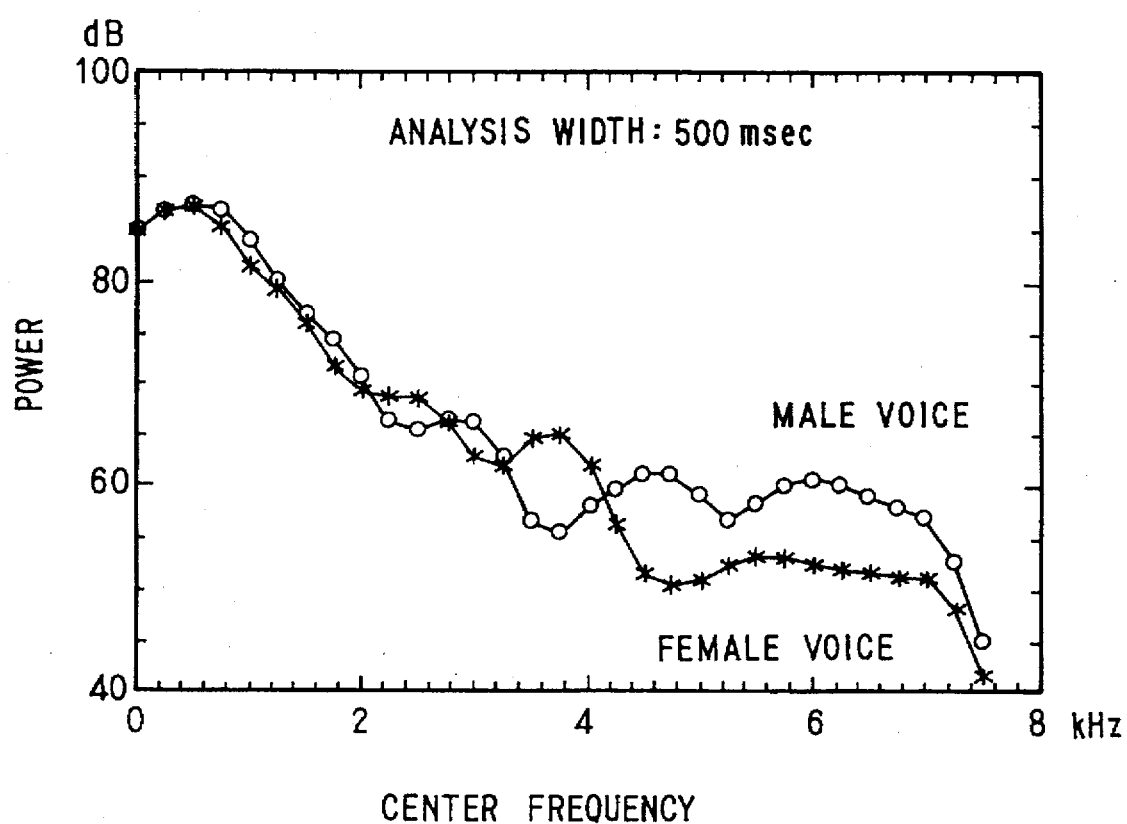
FIG. 4 is a graph showing, by way of example, long-time power spectrum characteristics of male and female speech sounds.

FIG. 4 shows the frequency-amplitude characteristics of male and female speech sounds analyzed over a 500 msec analysis width. As is evident from FIG. 4, the frequency-amplitude characteristics of both of the male and female speech sounds are maximum in power in the vicinity of 200 to 800 Hz. As set forth in textbooks of speech engineering, this tendency is common to all languages; approximately 80 percent of the power of the speech signal centers on the frequency band ranging from 200 to 800 Hz. That the speech signal is large in power means that the amplitude of the input signal into the adaptive filter is large, i.e. That the probability of stable adaptive filter operation is higher than in the other subband. The reason for which the input signal power is required to be large in the adaptive filter operation will be described below in connection with the NLMS (Normalized Least Mean Square) algorithm in FIG. 2. An equation for the iterative estimation of the estimated echo path in the NLMS algorithm is expressed as follows:

$$\hat{h}(n+1) = \hat{h}(n) + \mu e(n)x(n) / \sum_{i=0}^{L-1} x(n-i)^2$$

where:

$$\hat{h}(n) = [\hat{h}_0(n), \hat{h}_1(n), \ldots, \hat{h}_{L-1}(n)]^T$$

$$x(n) = [x(n), x(n-1), \ldots, x(n-L+1)]^T$$

In the above, $\hat{h}(n)$, is an estimated transfer function (which will hereinafter be referred to also as an estimated impulse response or estimated echo path coefficient) of the estimated echo path 22, L is the number of taps of the estimated echo path 22, x(n) is an input signal, e(n) is an error signal and μ is the step size. As will be seen from the above equation, since the denominator contains the short-time power of the input signal, the estimated transfer function $\hat{h}(n)$ of the estimated echo path 22 will be largely adjusted when the power of the input signal x(n) is small. In particular, when the input signal x(n) is small, the echo y(n)=h(n)*x(n) is also small and the influence of ambient noise (the speech s(n) of the near-end speaker, for instance) contained in the error signal e(n) grows, increasing the severity of this problem. Here, $$e(n) = y(n) - \hat{y}(n) + \text{noise}$$
$$= h(n) * x(n) - \hat{h}(n) * x(n) + \text{Noise}$$

Further, the probability of the received signal x(n) and the send signal s(n) being mixed, which is the double-talk state, is high in these subbands, the double-talk detecting accuracy increases by the provision of FG/BG filters in these subbands. In the present invention, when these subbands of large power are in the double-talk state, the adaptive filters in the other subbands are inhibited from operation. According to the present invention, it is determined whether the subbands with the FG/BG filters are in the non-double-talk state, that is, in the state suitable for adaptive operation, and if so, the adaptive operation is performed in the other subbands.

In view of the above, according to the present invention, the signal to be processed is divided into a plurality of subbands, in at least one of which an FG side estimated echo path is provided in addition to an echo path estimating part and a BG side estimated echo path, and when it is decided that the coefficient of the BG side estimated echo path has converged, the BG side estimated echo path coefficient is transferred to the FG side estimated echo path. Moreover, received signals and microphone output signals in the other subbands are delayed and the adaptive operation is carried out only during the convergence of the BG side filter coefficient. When error signals in the respective subbands are frequency-synthesized, the error signal in the subband using the FG/BG filter is delayed and the error signals are synthesized with the same timing over the full band.

Figure 1:
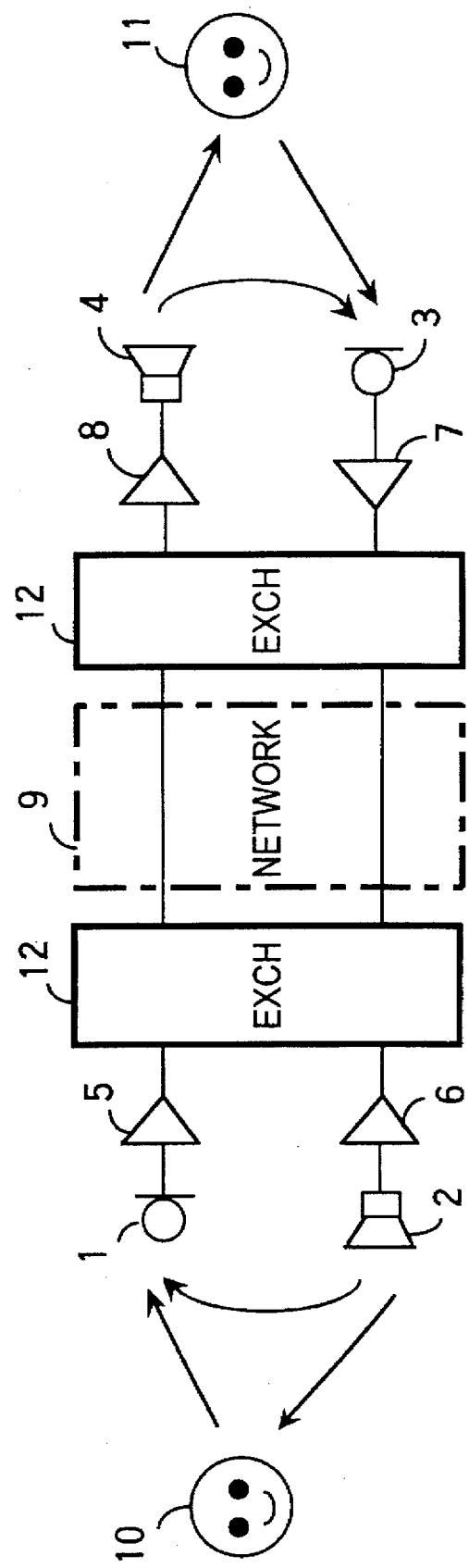
FIG. 1 is a block diagram for explaining the principle of a conventional hands-free communication.
Figure 2:
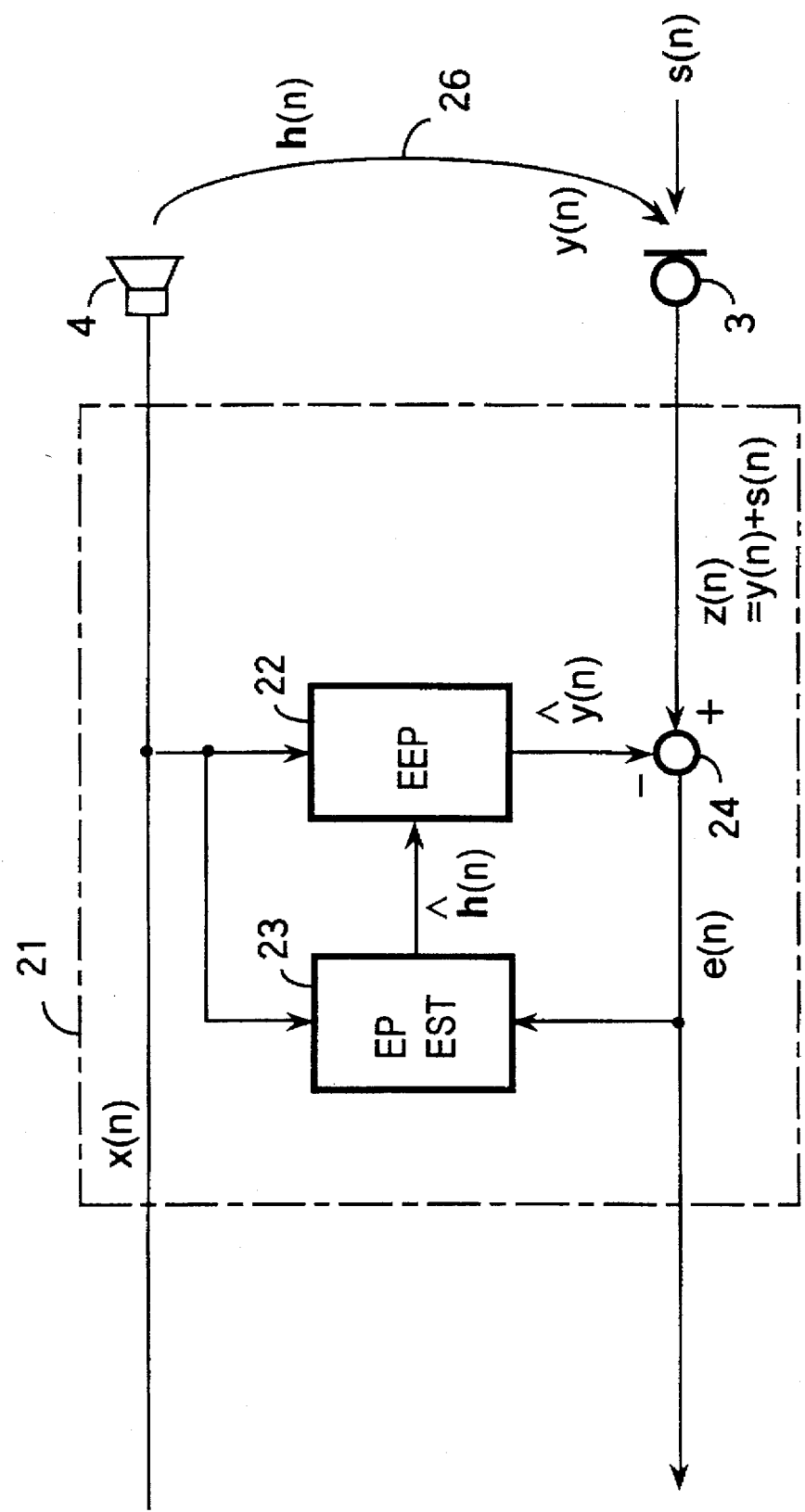
FIG. 2 is a block diagram for explaining the principle of a conventional echo canceller.
Figure 3:
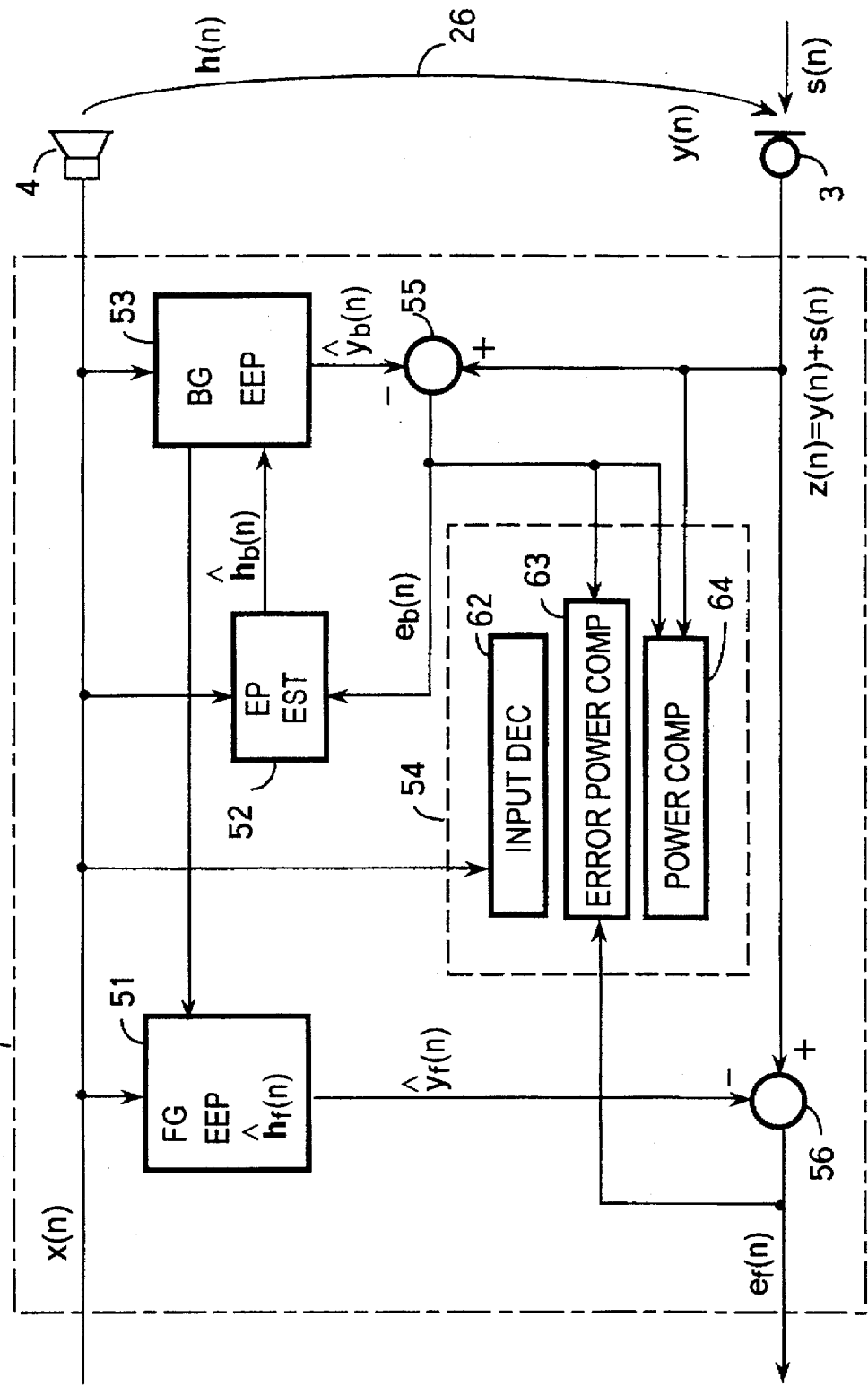
FIG. 3 is a block diagram for explaining a prior art example of an echo canceller using an FG/BG filter.
Figure 5:
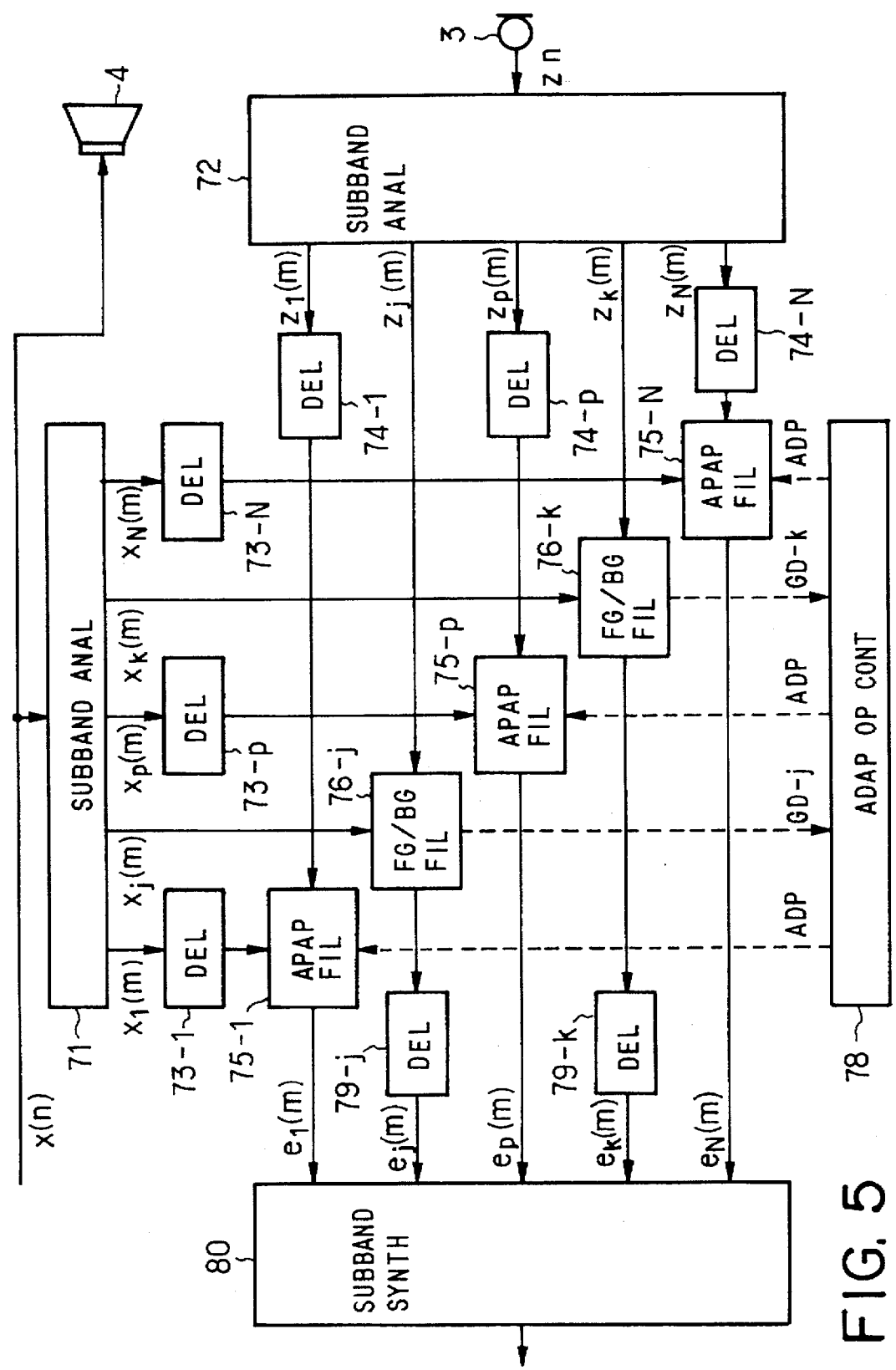
FIG. 5 is a block diagram illustrating the functional configuration of an embodiment of the present invention.

Turning now to FIG. 5, an embodiment of the present invention will be described, in which the parts corresponding to those in FIGS. 1, 2 and 3 are identified by the same reference numerals.

In FIG. 5 the signal to be processed is divided into N subbands, N being an integer equal to or greater than 2. Reference numeral 71 denotes a subband analysis part for the received signal and 72 a subband analysis part for the microphone output signal. FG/BG filters 76-j, 76-k, ..., are provided in M preselected j-th, k-th, ... ones of the N subbands, respectively. In this case, M is an integer such that 1≦M≦N-1. Reference numerals 73-1, ..., 73-P, ..., 73-N denote delay elements provided for the received signals in the other unselected subbands, 74-1 to 74-N delay elements provided for the microphone output signals in the unselected subbands, and 75-1 to 75-N adaptive filters provided in the unselected subbands. Thus, FG/BG filters 76-j, 76-k, ... are provided in the selected j-th, k-th, ..., subbands, respectively, whereas in the other unselected subbands the delay elements 73-1, ..., 73-P, ..., 73-N and the adaptive filters 75-1, ..., 75-P, ..., 75-N are provided. Reference numeral 78 denotes an adaptive operation control part, 79-j and 79-k delay elements for the outputs from the FG/BG filters 76-j and 76-k. The delay elements 73-1 to 73-N, 74-1 to 74-N, 79-j and 79-k are all provided for timing subband signals and are not essential to the present invention. Reference numeral 80 denotes a subband synthesis part.

Reference characters $x_1(m)$ to $x_N(m)$ denote subband-divided received signals, $z_1$ to $Z_N(m)$ subband-divided microphone output signals, $e_1(m)$ to $e_N(m)$ estimation error signals in the respective subbands, where m represents the discrete time of each signal having its samples decimated in the respective subband and bears a relationship n=R×m to the decimation rate which is represented by R.

The subband analysis part 71 divides the received signal x(n) into signals $x_p(m)$ (where p=1, ..., N) of N subbands.

Figure 6:
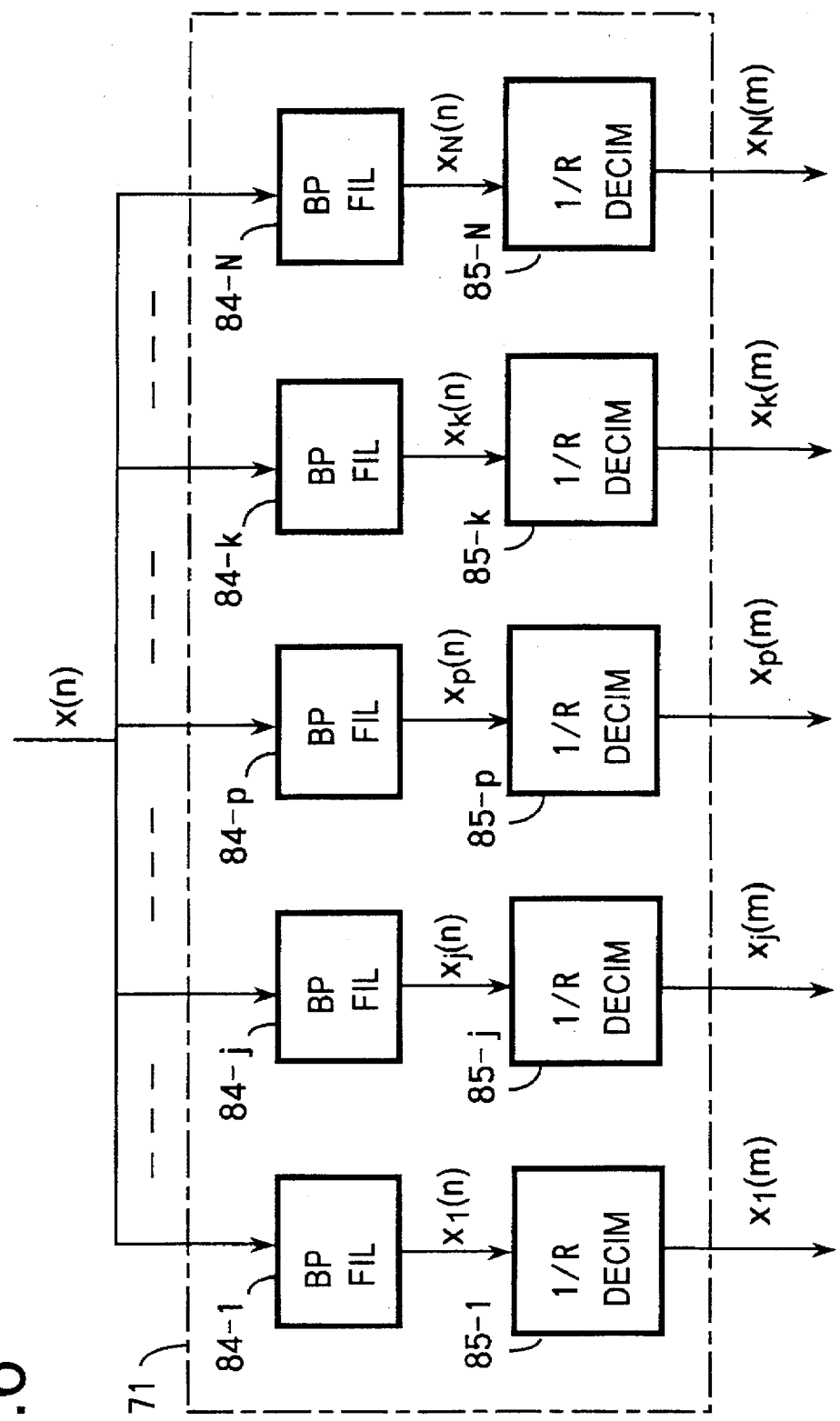
FIG. 6 is a block diagram illustrating the functional configuration of a subband analysis part for use in the present invention.

FIG. 6 illustrates in block form the internal configuration of the subband analysis part 71, in which the parts corresponding to those in FIG. 5 are identified by the same reference numerals. Reference numerals 84-1 to 84-N denote band pass filters and 85-1 to 85-N decimation parts for decimating the discrete time down to 1/R. The received signal x(n) is divided by the band pass filters 84-1 to 84-N into N subbands.

Of the received signals $x_p(m)$ (where p=1, ..., N) divided by the subband analysis part 71, the received signals $x_1(m)$ to $x_N(m)$ of the subbands except the received signals $x_j(m)$ and $x_k(m)$ of predetermined ones of the N subbands pass through the delay elements 73-1 to 73N. While the number M of the predetermined subbands is greater than 1 but smaller than N-1, the two j-th and k-th subbands will hereinafter be assumed to be predetermined subbands for convenience of description. That is, the received signals $x_p(m)$ (p=1, ..., N, p≠j, k) of the subbands other than those of the received signals $x_j(m)$ and $x_k(m)$ are input into the adaptive filters 75-p after the passage through the delay elements 73-p, whereas the received signals $x_j(m)$ and $x_k(m)$ are directly input into the FG/BG filters 76-j and 76-k.

Figure 7:
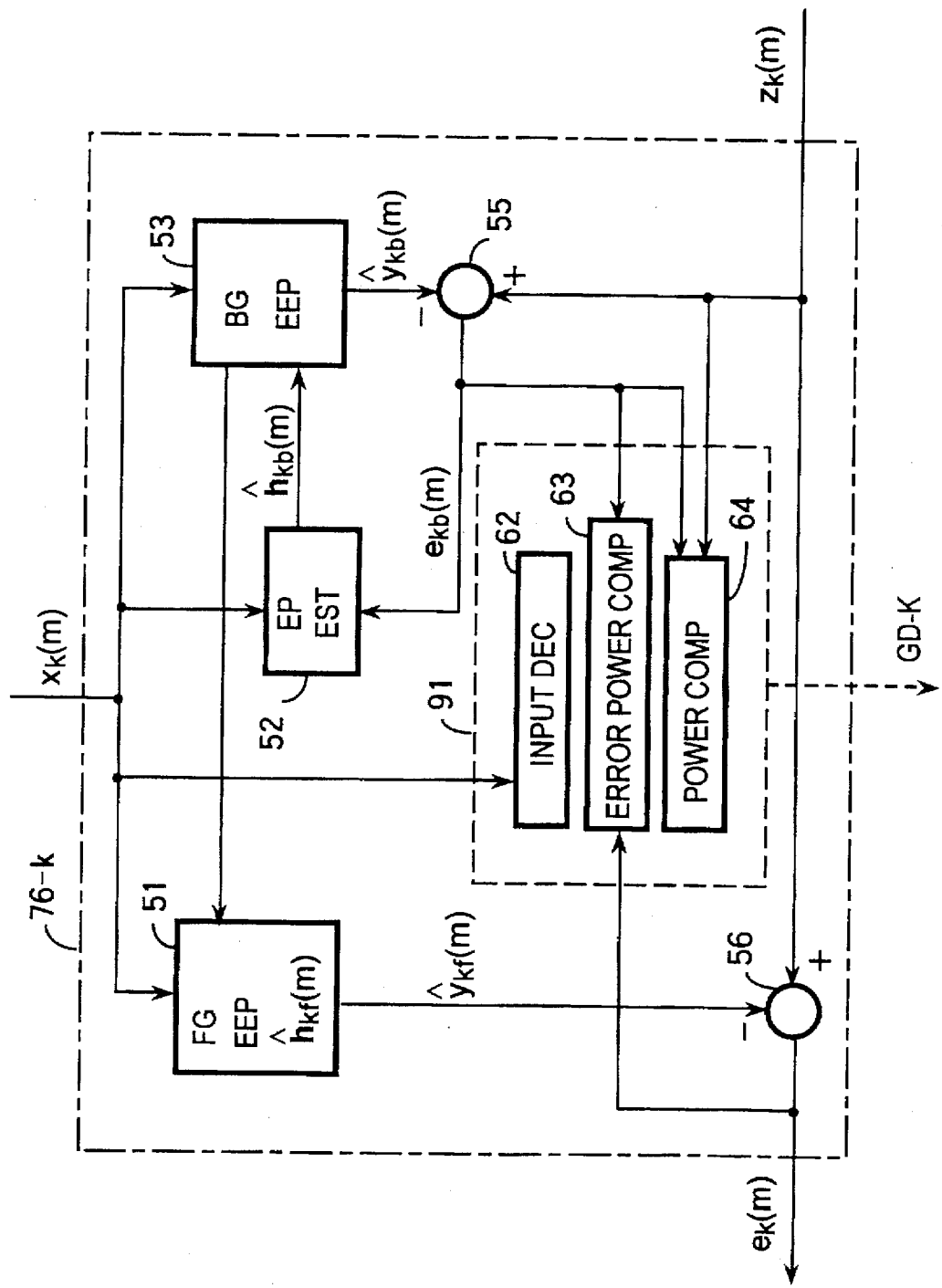
FIG. 7 is a block diagram illustrating the functional configuration of an FG/BG filter for use in the present invention.

FIG. 7 illustrates in block form the internal configuration of the FG/BG filter 76-k. The parts corresponding to those in FIG. 3 are identified by the same reference numerals. Reference character $\hat{h}_{kb}(m)$ represents a BG side estimated echo path coefficient of the FG/BG filter of the k-th subband and $\hat{y}_{kb}(m)$ its echo replica. Reference character $\hat{e}_{kb}(m)$ represents a BG side error signal of the FG/BG filter of the k-th subband, $\hat{h}_{kf}(m)$ an FG side estimated echo path coefficient of the FG/BG filter of the k-th subband and $\hat{y}_{kf}(m)$ its FG side echo replica. Reference numeral 91 denotes a transfer logic part and GD-k a state signal of an estimation error $e_k(m)$ in the FG/BG filter of the k-th subband.

The FG/BG filter 76-k is common in operation to the FG/BG filter described previously with respect to the prior art, except that signals input into and output from the former are both band-limited. That is, as is the case with the transfer logic part 54 for the conventional FG/BG filters 51 and 53 shown in FIG. 3, the transfer logic part 91 causes the echo path estimating part 52 to transfer the estimated echo path transfer function $\hat{h}_{kb}(m)$ to the FG side estimate echo path when the following the conditions are fulfilled:

(a) it is decided in the input decision part 62 that the power $P_x$ of the input signal $x_k(m)$ is larger than a predetermined threshold value $P_{th}$;

(b) it is determined in the power comparison part 64 that the power $P_{eb}$ of the estimation error $e_{kb}(m)$ of the BG side is smaller than the power $P_z$ of the microphone output signal $z_k(m)$ after being subband-divided in excess of a certain value, namely, that $P_{eb} < P_z \times C$, where C is a positive constant which is smaller than 1,; and (c) it is determined in the error power comparison part 63 that the power $P_{eb}$ of the BG side estimation error is smaller than the power $P_{ef}$ of the FG side estimation error.

When even one of the three conditions is not satisfied, the transfer logic part 91 inhibits the transfer of the transfer function as well. Hence, it is possible to achieve the same double-talk state detecting capability as that of the conventional FG/BG filter.

Incidentally, it is also possible to use, in place of the above-mentioned second condition (b), a condition that the peak hold value $PH_e(m)$ of the estimation error $e_{kb}(m)$ in a time shorter than the power measuring time is smaller than the peak hold value $PH_z(m)$ of the microphone output signal $z_k(m)$ in excess of a certain value as disclosed in the aforementioned Japanese Patent Application Laid-Open No. 226700/95. In this instance, the response speed to the double talk becomes faster. The peak hold values $PH_e(m)$ and $PH_z(m)$ can be defined, for example, by the following equations:

$$PH_e(m)=\text{MAX}\{e_{kb}^2(m), \gamma PH_e(m-1)\}$$

$$PH_z(m)=\text{MAX}\{z_k^2(m), \gamma PH_z(m-1)\}$$

where $\gamma$ represents an attenuation coefficient and MAX$\{a, b\}$ a function for comparing a and b and for outputting the larger value. The attenuation coefficient $\gamma$ is a value equal to or smaller than 1, preferably, in the range of 0.9999±0.00005.

In the FIG. 7 embodiment, the transfer logic part 91 of the FG/BG filter 76-k in the k-th subband outputs the state signal GD-k when it is decided that the first two conditions (a) and (b) are fulfilled. The state signal GD-k represents that the echo path estimating operation in the k-th subband is accurate, that is, that no double talk is present. This information is used to control the adaptive operation of the adaptive filter 75-p which has no double-talk detecting function. In this instance, if the third condition (c) is also used as a requirement, the frequency of the state signal GD-k being output decreases and the adaptive operation of the adaptive filter is not frequently carried out; therefore, the condition (c) is not used for control in the other subbands. The above is the operation of the FG/BG filter in the k-th subband and the FG/BG filter 76-j in the j-th subband also operates in the same manner as described above.

Turning back to FIG. 5, upon receiving the state signals GD-j and GD-k of the j-th and k-th FG/BG filters 76-j and 76-k at the same time, the adaptive operation control part 78 applies adaptation condition signal ADP to all the adaptive filters 75-p (p=1, ..., N, p≠j, k) except the j-th and k-th ones.

Figure 8:
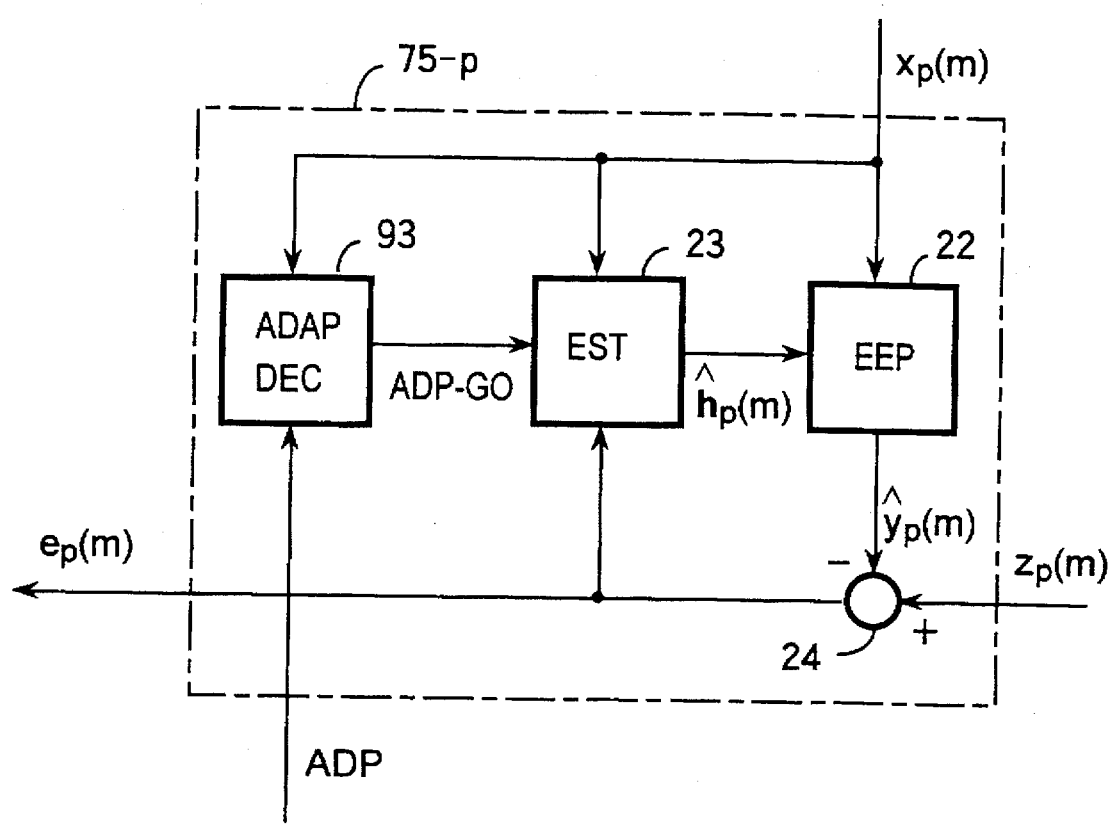
FIG. 8 is a block diagram illustrating the functional configuration of an adaptive filter for use in the present invention.

FIG. 8 is a block diagram illustrating the internal configuration of the p-th adaptive filter 75-p. The parts corresponding to those in FIG. 2 are identified by the same reference numerals. Reference numeral 93 denotes an adaptation logic part, and a reference character $\hat{h}_p(m)$ represents the estimated echo path coefficient of the p-th subband and $\hat{y}_p(m)$ its echo replica. The adaptation logic part 93 applies an estimating operation signal ADP-GO to the echo path estimating part only when the power of the subband-divided received signal $x_p(m)$ is larger than a predetermined threshold value and the adaptation logic part 93 receives the adaptation condition signal ADP. Only when receiving the estimating operation signal ADP-GO, the echo path estimating part 23 performs the adaptive operation, that is, updates the estimated echo path transfer function $\hat{P}(m)$. The updating can be done using any of various adaptive algorithms proposed so far. When either one or both of the two conditions (a) and (b) are not satisfied, no updating of the estimated echo path coefficient takes place, and consequently, the echo path estimating part 23 outputs $\hat{h}_p(m+1)=\hat{h}_p(m)$.

Figure 9:
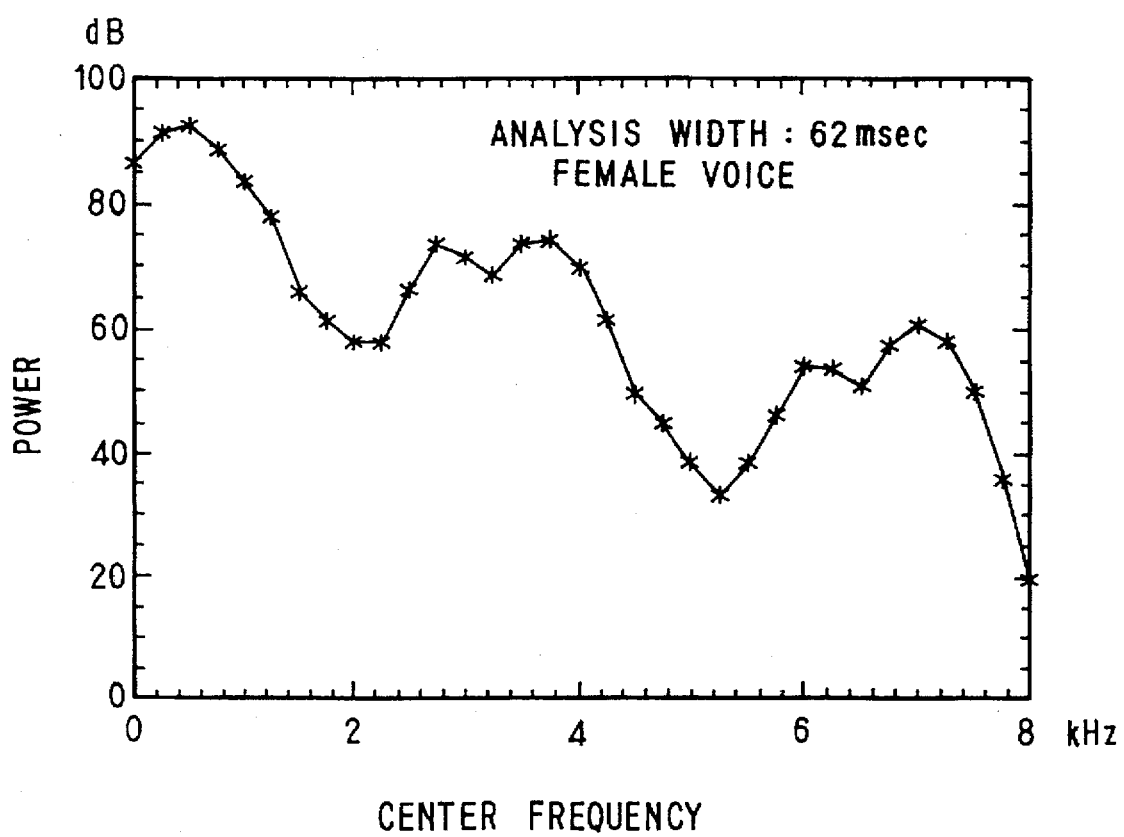
FIG. 9 is a graph showing an example of a short-time power spectrum characteristic of speech.

In this way, also in the subband where no FG/BG filter is provided, the adaptation logic part 93 of the adaptive filter 75-p controls the adaptive operation of the adaptive filter on the basis of the power of the received signal $x_p(m)$ in that subband as shown in FIG. 8. The reason for this control of the adaptive operation is as follows. As referred to previously, the spectrum characteristic of a speech signal varies as the phoneme being uttered changes and there is a possibility that the power in a certain subband (for example, in the vicinity of 5 kHz in FIG. 9) appreciably drops at a certain time despite the presence of the received signal as shown in FIG. 9 which shows the power spectrum characteristic of female speech with an analysis width of 62 msec. When the power in such a particular subband drops at some point in time, a major error will arise in the estimation of the echo path coefficient by the echo path estimating part in the adaptive filter 75-p of the that subband. To avoid this, in the FIG. 9 embodiment, only when the adaptation logic part 93 receives the adaptive signal ADP from the adaptive operation control part 78 and the power of the received signal $x_p(m)$ in that subband is larger than a predetermined value, the adaptation logic part 93 makes the echo path estimating part 23 update the echo path coefficient $\hat{h}_p(m)$, and it normally inhibits the echo path estimating part 23 from the updating operation and causes it to output $\hat{h}_p(m+1)=\hat{h}_p(m)$.

The two conditions (a) and (b) for the adaptive operation control part 78 to output the adaptation condition signal ADP are both based on the signal power. Since a predetermined integration time is needed to detect the signal power, a certain time delay develops in the decision of the power. To compensate for this time delay, there are provided, in the j-th and k-th subbands with the FG/BG filters 76-j and 76-k, the delay elements 79-j and 79-k at their output sides and the delay element 74-p at the input side of each adaptive filter 75-p. With such a configuration, it is possible to compensate for the time delay between the decision of the conditions (a) and (b) by the FG/BG filters 76-j and 76-k and the outputting therefrom of the state signals GD-j and GD-k. The delay time may preferably be approximately one-half of the integration time.

Of the error signals $e_1(m)$ to $e_N(m)$ in the individual subbands which are output from the adaptive filters 75-p and the Fg/BG filters 76-j and 76-k, the error signals $e_k(m)$ and $e_j(m)$ from the FG/BG filters 76-j and 76-k are applied to the subband synthesis part 80 after being delayed by the delay elements 79-j and 79-k for the same time interval as by the delay element 73-p at the input stage of the adaptive filter 75-p.

Figure 10:
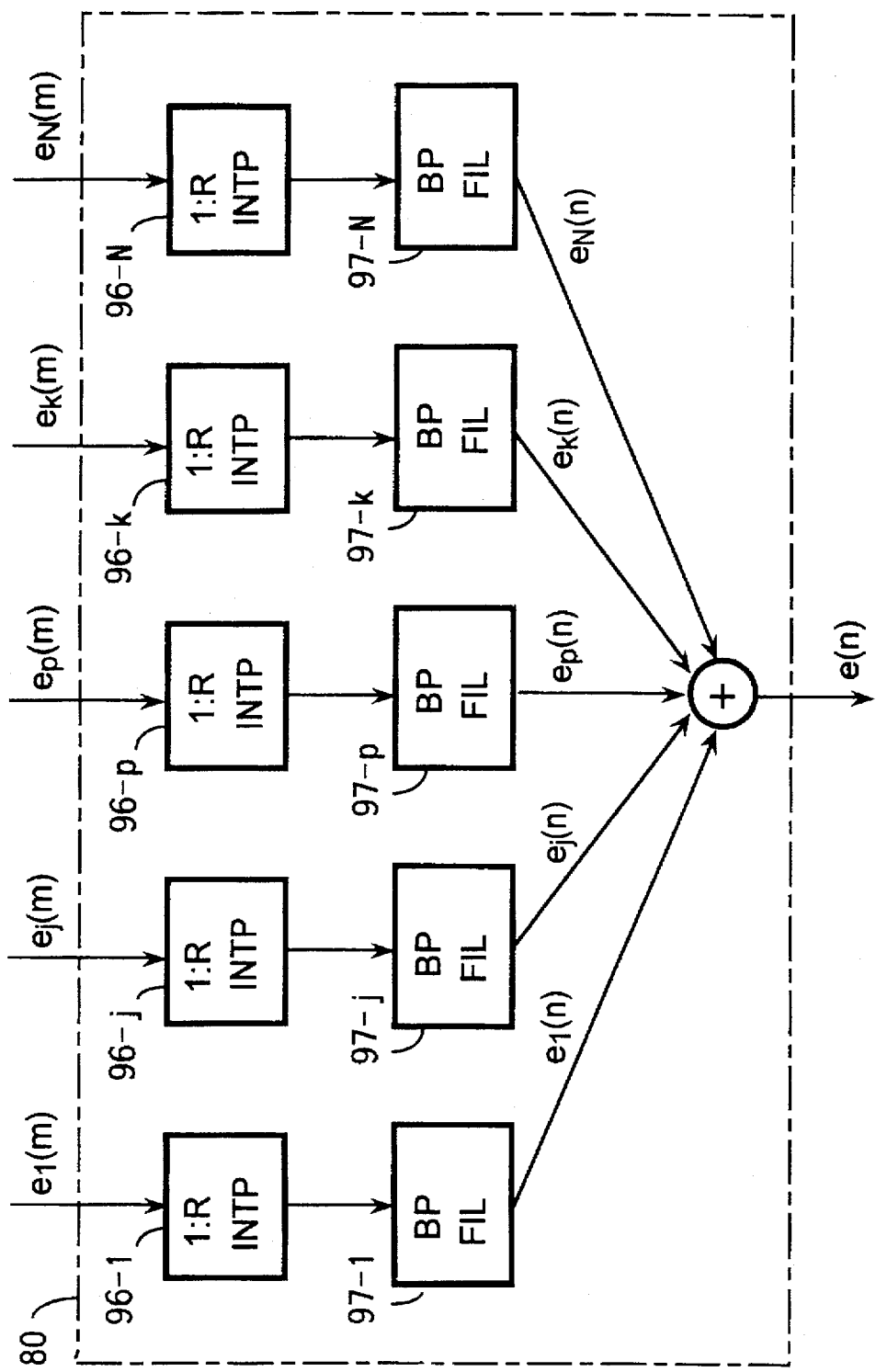
FIG. 10 is a block diagram for explaining the functional configuration of a subband synthesis part for use in the present invention.

FIG. 10 is a block diagram illustrating the functional configuration of the subband synthesis part 80. The parts corresponding to those in FIG. 5 are identified by the same reference numerals. Reference numerals 96-1 to 96-N denote 1:R interpolation parts for interpolating signals at a 1:R ratio and 97-1 to 97-N band pass filters. The error signals $e_p(m)$ (where p=1, ..., N) in the individual subbands are applied to the interpolation parts 96-p, where they are each sampled again at their initial sampling frequency, then the error signals $e_p(m)$ are applied to the band pass filters 97-p and the error signals are added together to obtain an error signal e(n) which has the full band component.

Next, a description will be given of the computational complexity of the echo canceller. Let the sampling frequency handled in the full band be represented by F and the length (the tap length) of the estimated echo path by L. Letting the amount of processing by the adaptive filter be represented by 2L, the computational load on the FG/BG filter is about 3L. When the received signal is divided into N subbands and is decimated at the 1:R ratio, the sampling frequency in each subband is F/R and the amounts of processing by the adaptive filter and the FG/BG filter are 2L/R and 3L/R, respectively. Assume, for example, that F=16 kHz, L=1600, N=32, R=32, the number of FG/BG filters M=4 and the number of adaptive filters (N−M)=28. The computational complexity per unit time by the conventional echo canceller using the FG/BG filter in every subband is as follows:

$$3\times1600\times16000=7.68\times10^7$$

On the other hand, the computational complexity per unit time by the echo canceller of the present invention is as follows:

$$2\times(1600/32)\times(16000/32)\times28+2\times(1600/32)\times(16000/32)\times4=1.7\times10^6$$

Thus, the computational complexity can be reduced down to approximately 1/50.

As described above, when the FG/BG scheme is applied to some of the subbands, it is preferable, in view of the measured results shown in FIG. 4, to use the FG/BG filters in subbands ranging from 200 to 800 Hz. For example, when the number N of subbands is 32, the subband frequency increases in steps of 250 Hz from the lowest subband 0–125 Hz to higher subbands 125–375 Hz, 375–625 Hz, . . . In order that the frequency band from 200 to 800 Hz may be covered by the subbands where the FG/BG filters are used, it is preferable to use at least three subbands 125 to 375 Hz, 357 to 625 Hz and 625 to 875 Hz. It is apparent, however, that the present invention is effective even if the FG/BG filter is used in only one subband.

When first formants of two speakers differ from each other as in the case where the speaker at one end of the hands-free communication system between remote places is a female and the speaker at the other end is a male, the provision of the FG/BG filter in only one subband is not preferable because the probability of detecting the double-talk state decreases. Further, since speech has a property that its spectral envelope varies in a short time, it is desirable to provide FG/BG filters over a wide range of subbands rather than to adopt the maximum value of the time-average value of the spectral envelope. In the case of adding one FG/BG filter with a view to increasing accuracy, it is provided in the subband immediately above the subband where the FG/BG filter is already provided, and in the case of adding another FG/BG filter, it is provided, for example, in the vicinity of 2 kHz where a second formant of speech appears.

While in the above the adaptive operation control part 78 in FIG. 5 has been described to output the signal ADP only when all the FG/BG filters 76-j, 76-k, . . . , Outputs the signals GD-j, GD-k, . . . , The control part 78 may also be so designed as to output the signal ADP when all the FG/BG filters in the subbands from 200 to 800 Hz, for instance, and 70 to 90 percent or more of the FG/BG filters in the other subbands output the signals GD-j, GD-k, . . .

In computer simulations the operation of the echo canceller was confirmed using five subbands 125 to 375 Hz, 375 to 625 Hz, 625 to 875 Hz, 875 to 1125 Hz and 1125 to 1375 Hz. Also in the case where the number N of subbands is small or large, it is desirable that the subbands where to provide FG/BG filters be selected to include 200 to 800 Hz or higher subbands. Once the subbands to provide FG/BG filters are determined, the subband analysis is limited accordingly.

EFFECT OF THE INVENTION

As described above, the subband acoustic echo canceller of the present invention divides the received signal into subbands and uses FG/BG filters in only specific ones of them; hence, the number of BG side filter coefficients is smaller than in the case of the conventional echo canceller using FG/BG filters in all of the subbands and the overall computational complexity of the echo canceller can be reduced accordingly.

The subband acoustic echo canceller of the present invention is capable of accurately controlling the operation of the adaptive filter by using the FG/BG filter information while delaying it and is free from the degradation of double-talk performance that the conventional echo canceller suffers.

It will be apparent that many modifications and variations may be effected without departing from the scope of the novel concepts of the present invention.

What is claimed is:

1. A subband acoustic echo canceller comprising:

a received signal subband analysis part for dividing a received signal sent out onto an echo path into signals of N subbands and for decimating samples of each of said divided signals to generate a subband received signal, said N being an integer equal to or greater than 2;

an echo subband analysis part for dividing an echo resulting from the propagation of said received signal over said echo path into signals of N subbands and for decimating samples of each of said divided signals to generate a subband echo signal;

N subband echo cancelling parts each provided in correspondence with one of said N subbands, for cancelling said subband echo signal;

wherein said N subband echo cancelling parts each comprises:

first estimated echo path means of estimated first estimated echo path coefficients, for generating a first subband echo replica by convoluting said first estimated echo path coefficients and said subband received signal;

first subtracting means for subtracting said first subband echo replica from said subband echo signal to generate a first error signal; and an estimating part for estimating said first estimated echo path coefficients from said first error signal and said subband received signal by an adaptive algorithm and for setting said first estimated echo path coefficients in said first estimated echo path means; and wherein M predetermined ones of said subband echo cancelling parts each comprises:

second estimated echo path means of second estimated echo path coefficients, for generating a second subband echo replica by convoluting said second estimated echo path coefficients and said subband received signal, said M being an integer equal to or greater than 1 but smaller than N−1;

second subtracting means for subtracting said second subband echo replica from said subband echo signal to generate a second error signal, said second error signals of said M predetermined subband echo cancelling parts and said first error signals of those other than said M subband echo cancelling parts being outputted as subband error signals; and transfer logic control means which detects the signal states of said subband received signal, said subband echo signal and said first and second error signals and which, if said signal states satisfy predetermined conditions, decides that said first estimated echo path is in the state of convergence and sets said first estimated echo path coefficients as said second estimated echo path coefficients in said second estimated echo path means to update its coefficients, and, if said signal states does not satisfy said predetermined conditions, inhibits the updating of said second estimated echo path coefficients; and a send signal subband synthesis part for synthesizing said subband error signals from said N subband echo cancelling parts through interpolation and for outputting said synthesized signal as a full-band send signal.

2. The subband acoustic echo canceller of claim 1, wherein each of said transfer logic control means in said M subbands comprises first compare means for comparing the power of said subband received signal with a predetermined value, second compare means for comparing the power of said first error signal with the power of said subband echo signal and third compare means for comparing the power of said first error signal with the power of said second error signal and, when (a) the power of said subband received signal is larger than said predetermined value, (b) the power of said first error signal is smaller than the power of said subband echo signal and (c) the power of said first error signal is smaller than the power of said second error signal, said each transfer logic control means sets said first estimated echo path coefficients as said second estimated echo path coefficients in said second estimated echo path means to update its coefficients, and, if any one of said three conditions is not satisfied, inhibits the updating of said second estimated echo path coefficients.

3. The subband acoustic echo canceller of claim 1, wherein each of said transfer logic control means in said M subbands comprises first compare means for comparing the power of said subband received signal with a predetermined value, second compare means for comparing the peak hold value of said first error signal with the peak hold value of said subband echo signal and third compare means for comparing the power of said first error signal with the power of said second error signal and when (a) the power of said subband received signal is larger than said predetermined value, (b) the peak hold value of said first error signal is smaller than the peak hold value of said subband echo signal and (c) the power of said first error signal is smaller than the power of said second error signal, said each transfer logic control means sets said first estimated echo path coefficients as said second estimated echo path coefficients in said second estimated echo path means and, if any one of said three conditions is not satisfied, inhibits the updating of said second estimated echo path coefficients.

4. The subband acoustic echo canceller of claim 2 or 3, wherein each of said transfer logic control means in said M subbands outputs a convergence state signal when said first and second conditions (a) and (b) are satisfied, which further comprises adaptive operation control means which applies an adaptation condition signal to each of said subband echo cancelling parts other than those in said M subbands only when receiving said convergence state signals from more than predetermined ones of said transfer logic control means in said M subbands, and said subband echo cancelling parts other those in said M subbands each comprises an adaptation logic part which permits said estimating part to update said first subband estimated echo path coefficients only when supplied with said adaptation condition signal from said adaptive operation control means but normally inhibits the updating of said first subband estimated echo path.

5. The subband acoustic echo canceller of claim 2 or 3, further comprising first delay means for delaying said subband error signals output from said echo cancelling parts of said M predetermined subbands and second delay means for delaying said received signals and said subband echo signals in the subbands other than said M subbands.

6. The subband acoustic echo canceller of claim 1, 2, or 3, wherein at least one of said M subbands is within a frequency range of 200 to 800 Hz.

* * * * *